(No Model.)

R. K. JONES.
RATCHET DRILL.

No. 285,629. Patented Sept. 25, 1883.

Witnesses
James Johnson
John Richman

Inventor
Robert Kent Jones

UNITED STATES PATENT OFFICE.

ROBERT K. JONES, OF LIVERPOOL, COUNTY OF LANCASTER, ENGLAND.

RATCHET-DRILL.

SPECIFICATION forming part of Letters Patent No. 285,629, dated September 25, 1883.

Application filed July 17, 1883. (No model.) Patented in England May 1, 1883, No. 2,190.

*To all whom it may concern:*

Be it known that I, ROBERT KENT JONES, a subject of the Queen of Great Britain, residing at Liverpool, in the county of Lancaster, England, have invented a new and useful Improvement in Ratchet-Braces, (for which I have obtained a patent in Great Britain, No. 2,190, bearing date May 1, 1883, and nowhere else,) of which the following is a specification.

My invention relates to ratchet-braces in which the drill-stock and drill are caused to move forward during both the outstroke and instroke of the operating lever or handle.

The ratchet drill or brace most nearly approaching my invention is shown in Letters Patent to C. Sinclair, dated September 1, 1868, and is formed of a ratchet-wheel secured to a drill-shaft, and operated by a spring-pawl on the lever, and to gear-wheels journaled on the shaft, and having a pinion meshing between them, one of these wheels engaging, by means of a ratchet, with a pawl on the lever, and the other with a spring-bolt on the drill-shaft. I find, however, that drills of this construction are more complicated than necessary, and that by my improvements they are formed with less parts and are operated with less friction, as well as that they are stronger, less liable to get out of order, and cheaper in construction.

My invention consists, essentially, in combining with the drill-stock a ratchet-wheel rigidly secured thereto and moved by the lever-pawl in one direction, said ratchet-wheel having suitable gearing thereon, a ratchet-wheel journaled on the drill-stock and moved by the lever and pawl in the opposite direction, said ratchet-wheel having suitable gearing, one gear being external and the other internal, and one or more pinions mounted on a suitable arm and meshing into the gear of the two ratchet-wheels, so that when the lever is turned in one direction through the fixed ratchet-wheel it turns the drill with it, and when the lever is turned in the opposite direction through the journaled ratchet-wheel and pinions between the gearing of the ratchet-wheels it turns the fixed ratchet-wheel in the direction it was turned by the other movement of the lever.

To enable others skilled in the art to make and use my invention, I will describe its construction and operation, referring to the accompanying drawings, in which—

Figure 1:
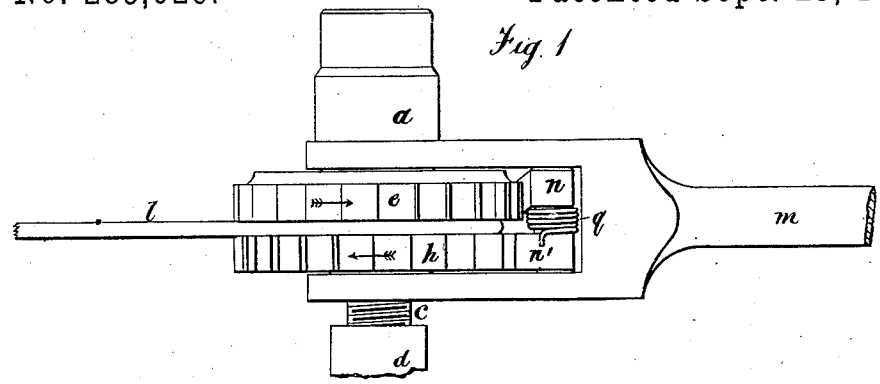
Figure 2:
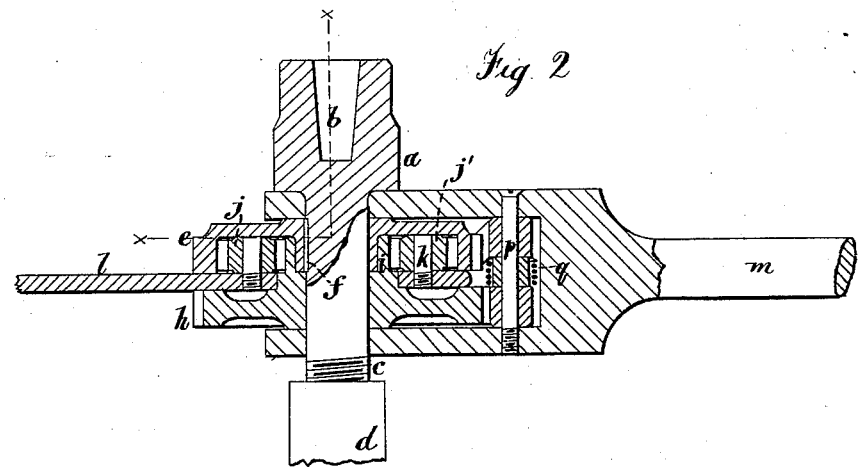
Figure 3:
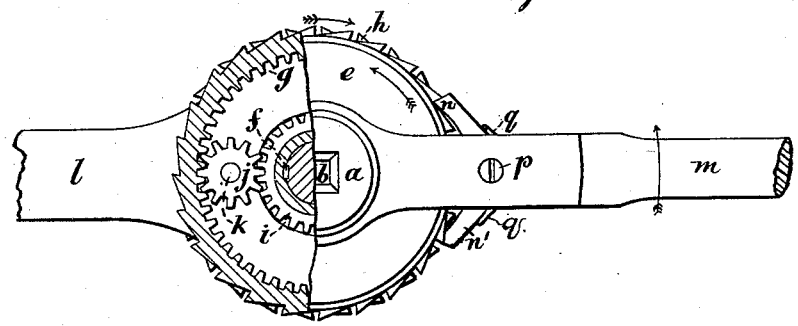

Figure 1 is a side elevation, Fig. 2 a transverse section, and Fig. 3 a face view, partly in section, on the line *x x*, Fig. 2, of a ratchet-brace constructed under my invention.

Like letters refer to similar parts throughout the several views.

In the drawings, *a* is the drill-stock, formed at one end with the recess *b*, to receive the drill, and at the other end with a screw, *c*, to carry the nut *d*, for feeding forward the drill-stock. *e* is a recessed ratchet-wheel, rigidly secured to the drill-stock by a key, *f*, or by other suitable means, and provided with internal teeth or gear, *g*. *h* is a ratchet-wheel journaled on and free to rotate around the drill-stock, and formed with the pinion or external toothed gear, *i*, and having its ratchet-teeth disposed in the opposite direction to those on *e*; *j j*, intermediate wheels or pinions, gearing into *g* and *i*, and carried by studs *k* on the arm *l*; *m*, operating lever or handle; *n n'*, pawls; *p*, carrying-spindle; *q*, helical spring for keeping the pawls engaged with the teeth of the ratchet-wheels.

In use a brace-stand of any usual construction is employed, and the arm *l* is secured against the upright or any convenient portion of the stand. The lever *m* is moved in the direction shown by the arrow—say for the outstroke—and by means of the pawl *n* moves the ratchet-wheel *e*, and with it the drill-stock by means of the key *f*, in the direction shown by the arrow. On the return or instroke the pawl *n'* carries round with it the ratchet-wheel *h* in the direction shown by the arrow. The said ratchet-wheel moves freely round the drill-stock and actuates the intermediate wheels, *j*, and through them the ratchet-wheel *e* and drill-stock *a* in the reverse direction to that in which the ratchet-wheel *h* itself moves—that is to say, the ratchet-wheel *e*, and with it the drill-stock, is caused to move in the same direction during the instroke as it did during the outstroke.

As arranged, the speed of motion of the drill-stock is reduced on the instroke, but the power then required to drive it is less than during the outstroke. If desired, the pinion *i* might be secured to the ratchet-wheel *e*, and the internal teeth, *g*, be formed on the ratchet-wheel *h*, in which case the forward motion of the drill-stock would be greater on the instroke than on the outstroke.

One advantage of the use of my apparatus is that a hole is drilled in much less time and with less expenditure of power than with a single-acting brace, as the motion of the drill is almost continuous, and, no retrograde pressure being caused to act on it, the cutting-edges may be made much more effective.

It will be obvious that under my invention any suitable feed mechanism may be used, that the drill may be secured to the stock in any convenient manner, that one or more intermediate wheels may be used, and each pawl may be actuated by a separate spring suitably arranged.

What I claim as my invention, and desire to secure by Letters Patent, is—

1. In ratchet-braces, the combination, with the drill-stock, of the ratchet-wheel *e*, rigidly secured thereto and having a toothed gear, the ratchet-wheel *h*, journaled thereon and having toothed gear, (the gear upon one of said ratchet-wheels being external and upon the other internal,) one or more pinions, *j*, mounted on a suitable arm, *l*, and meshing into the gears on the ratchet-wheels, and the operating-handle *m*, substantially as and for the purposes set forth.

2. In ratchet-braces, the combination, with the drill-stock, of the ratchet-wheel *e*, secured thereto, and having the internal gear, *g*, ratchet-wheel *h*, having the external gear, *i*, one or more pinions, *j*, carried by the arm *l*, and meshing into said gear on the wheels *e* and *h*, and operating-handle having the spring-pawls *n n'*, substantially as and for the purposes set forth.

ROBERT KENT JONES.

Witnesses:
JAMES JOHNSON,
JOHN RICHMAN.